(12) United States Patent
Namur

(10) Patent No.: US 9,023,205 B2
(45) Date of Patent: *May 5, 2015

(54) FILTER CARTRIDGE

(75) Inventor: Marc Namur, Darmstadt (DE)

(73) Assignee: Brita GmbH, Taunusstein (DE)

(*) Notice: Subject to any disclaimer, the term of this patent is extended or adjusted under 35 U.S.C. 154(b) by 767 days.

This patent is subject to a terminal disclaimer.

(21) Appl. No.: 11/665,315

(22) PCT Filed: Oct. 11, 2005

(86) PCT No.: PCT/EP2005/010915
§ 371 (c)(1),
(2), (4) Date: Oct. 12, 2007

(87) PCT Pub. No.: WO2006/040121
PCT Pub. Date: Apr. 20, 2006

(65) Prior Publication Data
US 2008/0121581 A1 May 29, 2008

(30) Foreign Application Priority Data
Oct. 13, 2004 (DE) .......................... 10 2004 049 876

(51) Int. Cl.
*B01D 24/10* (2006.01)
*A47J 31/60* (2006.01)
*C02F 1/00* (2006.01)
(Continued)

(52) U.S. Cl.
CPC ............... *A47J 31/605* (2013.01); *C02F 1/001* (2013.01); *C02F 1/283* (2013.01); *C02F 5/10* (2013.01); *C02F 2201/006* (2013.01); *C02F 2301/043* (2013.01)

(58) Field of Classification Search
CPC .. A47J 31/605; C02F 1/001; C02F 2301/043; C02F 5/10; C02F 2201/006; C02F 1/283
USPC .............. 210/172.3, 282, 284, 286, 291, 293, 210/416.3, 418, 420, 429, 130–133, 254, 210/266, 285, 289, 428, 334, 502.1, 317, 210/473
See application file for complete search history.

(56) References Cited

U.S. PATENT DOCUMENTS 1,195,427 A * 8/1916 Widner ..................... 210/289
2,358,748 A * 9/1944 Thompson ................. 210/172.3
(Continued)

FOREIGN PATENT DOCUMENTS

DE    87 13 769 U1    1/1988
DE    37 80 990 T2    1/1993
(Continued)

OTHER PUBLICATIONS

Brauburger, Derwent Patent abstract of EP 844339 A2 and DE 19648405A, Derwent, 1998, Derwent Acc. No. 1998-299739.*
(Continued)

*Primary Examiner* — Matthew O Savage
(74) *Attorney, Agent, or Firm* — Hudak, Shunk & Farine Co. LPA

(57) ABSTRACT

The invention relates to a filter cartridge (1), in particular a suction filter cartridge, in which the inlet region (10) and the outlet opening (20) are arranged in the base region. The outlet opening (20) is connected to the inlet region (10) via a bypass, which is located in a lower section of the outflow chamber (2a) or below the outflow chamber (2a).

17 Claims, 7 Drawing Sheets

(51) Int. Cl.
*C02F 1/28* (2006.01)
*C02F 5/10* (2006.01)

(56) References Cited

U.S. PATENT DOCUMENTS

| | | | | |
|---|---|---|---|---|
| 3,367,507 | A | * | 2/1968 | Hultgren ................ 210/434 |
| 4,526,378 | A | * | 7/1985 | Fisher et al. ............ 277/617 |
| 4,725,354 | A | | 2/1988 | Thomsen et al. |
| 5,340,478 | A | * | 8/1994 | Strand et al. ............ 210/284 |
| 5,460,719 | A | * | 10/1995 | Clack et al. ............ 210/233 |
| 5,855,777 | A | | 1/1999 | Bachand et al. |
| 6,383,375 | B1 | * | 5/2002 | Zucholl ................ 210/172.2 |
| 6,533,931 | B1 | | 3/2003 | Reid |
| 7,455,769 | B2 | * | 11/2008 | Heitele ................ 210/284 |
| 7,722,766 | B2 | * | 5/2010 | Namur ................ 210/232 |
| 2003/0136728 | A1 | * | 7/2003 | Jagtoyen et al. ........ 210/502.1 |
| 2003/0159979 | A1 | | 8/2003 | Chau |

FOREIGN PATENT DOCUMENTS

| | | | |
|---|---|---|---|
| DE | 44 22 709 A1 | 1/1996 | |
| DE | 196 48 405 A1 | 10/1998 | |
| EP | 0 992 459 A2 | 4/2000 | |
| GB | 1 543 590 | 4/1979 | |
| JP | 09174050 A | 7/1997 | |
| WO | WO 99/01220 A1 | 1/1999 | |
| WO | WO 2004007374 A1 * | 1/2004 | ............... C02F 1/42 |

OTHER PUBLICATIONS

German language Opposition Brief dated Jun. 27, 2008 issued for corresponding German Patent Application No. 10 2004 049 876 B4.
PCT Notification of Transmittal of Translation of the International Preliminary Report on Patentability (Chapter I or Chapter II of the Patent Cooperation Treaty); International Preliminary Report on Patentability; International Application No. PCT/EP2005/010915; Filing date Oct. 11, 2005 for Brita GmbH.

* cited by examiner

FILTER CARTRIDGE

BACKGROUND OF THE INVENTION

1. Field of the Invention

The invention relates to a filter cartridge, in particular a suction filter cartridge, according to the preamble of claim 1. The inlet area and the outlet opening of the filter cartridge are arranged at the bottom area of the filter cartridge, which also includes a lateral inlet or outlet in a lower section of the inflow and outflow chamber adjacent to the bottom.

2. Description of Related Art

Suction filter cartridges are used in water vessels of automatic drink dispensers, e.g., for hot drinks, provided with a suction pump, such as e.g., coffee makers etc. The inlet and outlet openings of the suction filter cartridge are located in the bottom area of the otherwise completely enclosed cartridge housing. A seat element is arranged in the water vessel of the device, adjusted to the outlet opening, which may be a separate component or be formed at a water vessel. This seat element has an outlet opening as well, through which the filtered water can flow out of the water vessel. The seat element serves to accept the suction filter cartridge inserted into this seat element.

Due to the fact that the outlet opening of the water vessel is connected to the suction pump of the device, the water to be filtered is suctioned out of the water vessel, passes the filter medium or filter media in the cartridge, and reaches the outlet opening in a filtered state.

From WO 99/01220 a suction filter cartridge is known, in which the water inlet opening is arranged at the bottom and a pass for water through the filter media is provided in the up-current. Furthermore, a downspout is provided for guiding the water downwards to an extraction connector of the water vessel located at the bottom. Here, the mixture of filter means comprising activated carbon and ion exchangers are floated during operation, counteracting any compression of the filter bed.

The downspout is arranged centrally inside the suction filter cartridge, so that the bottom connector of the suction filter cartridge can also occur centrally. Here, the inlet opening is arranged circularly in the suction filter cartridge.

Depending on the water quality found on the location of the automatic drink dispensers and the selected coffee brand, in certain circumstances entirely decarbonized water may not be optimal for the development of the aroma, and even the machine parts may be damaged. When decarbonization is not adjusted, in the worst case scenario, corrosion of the metal components may develop so that high maintenance and repair costs may result.

From DE 44 22 709 A1 a filter device is known, in particular a filter cartridge, including water filtration and/or water decalcification, which may also be operated with normal, untreated crude water flowing through. The device is provided with at least two chambers, separated from each other by a wall extending in the direction of the longitudinal axis of the hollow body. One of the chambers is filled with one filter means, while the other chamber has received a different filter means or may be empty as well. In the upper inlet area an adjustment ring is provided having openings which can be aligned to openings of the chambers in order to allow the water to be treated to flow into the respective chambers. Alternatively outlet openings may also be arranged in the lower area of the device having an adjustable device.

The flow of the water to be treated may occur by gravity or by the pressure from a tap. Thus, it does not represent a suction filter cartridge. Therefore, in any case here the inlet and the outlet openings are arranged on opposite sides of the filter device so that in case of a bypass an empty chamber must be provided.

For suction filter cartridges that must be used in restricted water vessels and are thus to be designed in a respectively compact manner such a bypass devices is not suitable.

BRIEF SUMMARY OF THE INVENTION

The object of the invention is to provide a filter cartridge, in particular a suction filter cartridge, in which the desired carbonization level can be adjusted to the respective quality of the crude water.

This object is attained in a filter cartridge, in particular in a suction filter cartridge, with its outlet opening being connected to the inlet area via a bypass, arranged in a lower section of the up-current chamber and/or the down-current or below the up-current and/or the up-current chamber.

Preferably the cross-section of the bypass is embodied adjustable.

The adjustable bypass is preferably sized such that not the entire crude water immediately flows from the inlet opening into the outlet opening. Preferably the bypass is designed such that no more than 50% of the crude water can be diverted to the outlet opening.

Using the bypass the performance of the cartridge can be adjusted to the water quality so that optimal water can be taken from the flavor and for the beverage machine.

The arrangement of the bypass in the lower section of the down-current chamber or below the up-current chamber additionally has the advantage that no additional space is necessary so that the horizontal dimensions of the known filter cartridges, in particular suction filter cartridges, can be maintained.

Preferably the outlet opening is provided with an outlet sleeve, with the inlet area surrounding the outlet sleeve in a circular manner.

In a preferred embodiment the outlet sleeve is provided with at least one rotating adjustment ring.

According to a first variant the outlet sleeve is provided with at least one first opening. The adjustment ring is provided with a cylindrical section contacting the outlet sleeve, at which preferably a closing element or in which preferably at least one second opening is provided, which can be aligned to the first opening. In this case the first and second opening(s) combined form the bypass opening(s). Additional pipes, hoses, or chambers for realizing the bypass are not necessary.

By rotating the adjustment ring the cross-section of the first opening of the outlet sleeve can be adjusted such that the added amount of the untreated crude water can be added to the water treated by the filter means in the filter cartridge, adjusted in a controlled manner. Using such a bypass the performance of the filter cartridge can be adjusted to the water quality such that the water best for the aroma and best for the automatic drink dispensers can be provided.

Additionally, the integrated bypass increases the capacity of the filter cartridge. When based on the water quality less performance is necessary, it is adjustable and the filter cartridge softens to the same level for a longer period of time.

Additionally, it is advantageous when the second opening of the adjustment ring ≥ the first opening of the outlet sleeve.

The cylindrical section of the adjustment ring preferably contacts the exterior of the outlet sleeve in a sealing manner. This way it is prevented that when the first openings are closed unintentionally crude water can reach, in particular through the second openings of the adjustment ring between the adjustment ring and the outlet sleeve, into the outlet opening.

A second variant provides at least one bypass opening in the bottom wall of the outflow chamber. The bypass opening is preferably closed by a closing element arranged at the adjustable ring, with the crude water amounts flowing through the bypass opening can be adjusted by way of rotating the adjustable ring.

The closing element may be an arc-shaped collar arranged at a adjustment ring, which preferably contacts the bottom of the bottom wall of the outflow chamber in a sealing manner.

Instead of a closing element, similar to the first variant, the collar may be provided with one or more second opening(s), which can be aligned to the opening(s) in the bottom wall of the outflow chamber.

Different from the first variant, the crude water does not reach the outlet sleeve immediately, rather it is guided into the interior of the outflow chamber, allowing this crude water also to be filtered.

The extent crude water is guided into the interior chamber of the outflow chamber can be defined by the length of the riser surrounding a bypass opening. The lower section of the outflow chamber is therefore jointly used by the already filtered water and by the crude water introduced via the bypass opening.

The jointly used area may be provided with a fill of activated carbon for dechlorinating the bypass water. Depending on the type and form of the fill material a separating layer may be provided on the fill, comprising a fleece, for example, in order to prevent any mixing with the filter means, arranged perhaps thereabove, e.g., made from an ion exchanging material.

This jointly used area inside the down-current chamber may also be separated by an intermediate floor not penetrable by liquids. In the chamber formed between the bottom and the intermediate floor a filter medium may be arranged, particularly an activated carbon fleece.

In another embodiment of the invention the outlet sleeve at the adjustment ring may advantageously also be used for fixing the filter cartridge on a seat element when an encircling snap rim is provided in the outlet opening, pointing inwardly, which can be turned from a first lower snap position into a second upper snap position and vice versa.

The respective seat element is characterized by a connecting sleeve, engaging the outlet opening of the filter cartridge, having at least one actuator, which moves from the first lower snap position into the second upper snap position when the filter cartridge is placed down, in which the snap-on rim contacts the connecting sleeve in a sealing and clamping manner.

Preferably the actuator is a circular shoulder arranged at the connecting sleeve.

The suction filter cartridge with the snap-on rim being in the lower snap position is placed from the top onto the seat element and pushed down until the snap-on rim turns upward and thus engages the connecting sleeve of the seat element. The seat element is adjusted to the snap-on rim such that it contacts and fixes the suction filter cartridge at the edge of the connecting sleeve in a sealing manner when the snap-on rim is turned. The turning signals to the operator that the filter cartridges have reached their predetermined sealing position. This way a faulty positioning by the operator is prevented.

In order to remove the filter cartridge it is only pulled out upwards, which turns the snap-on rim back into its lower snap position.

By the turn-over process of the snap-on rim radial forces act upon the outlet sleeve, which may lead to a widening and perhaps to a reduction of the clamping forces in the upper second snap position. The adjustment ring here also acts in a stabilizing function for the outlet sleeve.

Preferably the snap-on rim is linked at the bottom end of the outlet sleeve.

The snap-on rim may be linked via a film link.

The snap-on rim is preferably a flat edge strip extending radially inward.

The edge strip is preferably embodied as a ring.

The snap-on rim settles in two stable positions, namely a lower position and an upper one. The intermediate position of the snap-on rim is an unstable position, from which based on its tension it automatically turns into one or the other position. The snap-on rim advantageously comprises an elastic plastic.

Advantageously the adjustment ring is provided with an angled collar protruding into the outlet opening, which the snap-on rim contacts in the first lower snap position. This ensures a defined original position for the snap-on rim.

Preferably the adjustment ring is arranged at the outlet sleeve in a sealing manner.

This prevents that particularly in case of closed first openings unintentionally crude water can enter into the outlet opening through the second openings between the adjustment ring and the outlet sleeve.

Both the up-current chamber as well as the down-current chamber may be provided with at least one filter means. It has shown advantageous for the up-current chamber to be provided with an fluidized bed and the down-current chamber with a packed bed.

The advantage of the equipment of both filter chambers with filter means lies the fact that the risers and/or downspouts of prior art, extending over the entire height of the suction filter cartridge, can be omitted. The fluidized bed in the up-current chamber causes only a slight loss of pressure.

Advantageously the outlet sleeve and/or the adjustment ring, are provided, preferably below the first opening, with at least one sealing bead extending around the perimeter such that any unintended bypass is prevented.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the following, exemplary embodiments of the invention are explained in greater detail using the drawings. A suction filter cartridge is described as an example for the filter cartridge according to the invention. Wherein.

DETAILED DESCRIPTION OF THE INVENTION

Figure 1:
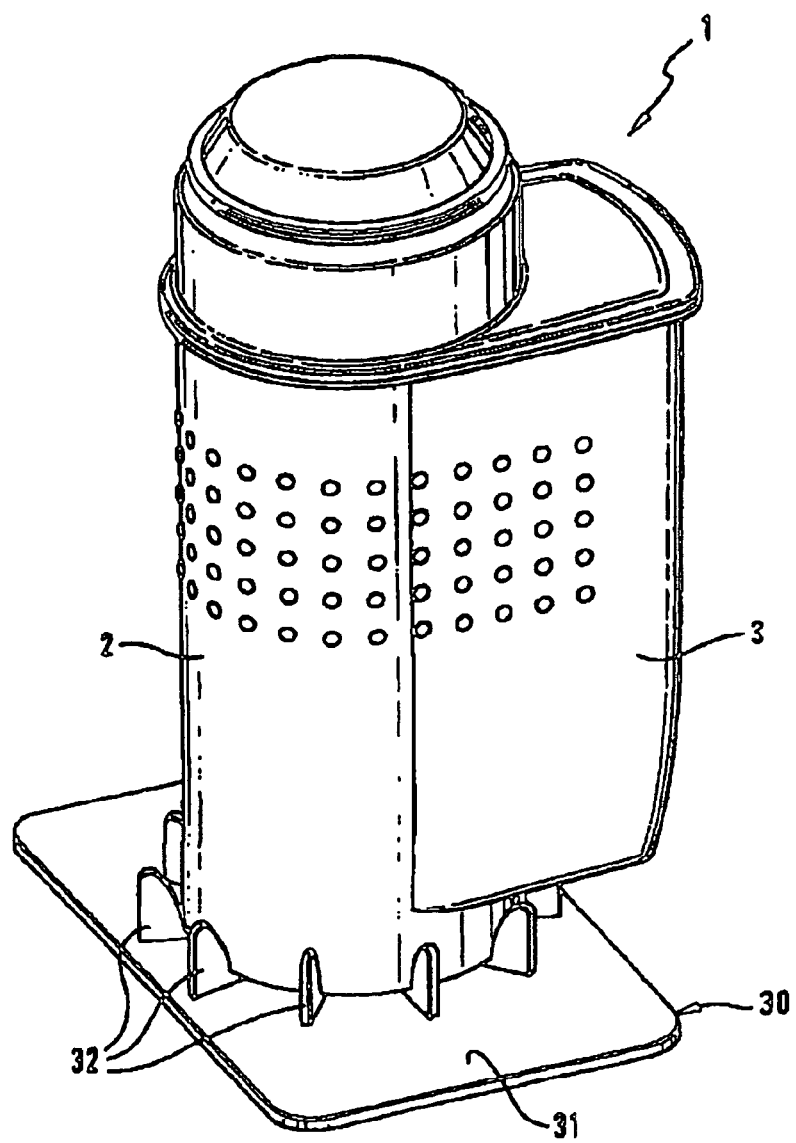
FIG. 1 is a perspective view of a suction filter cartridge having an attached seat element.

In FIG. 1 a suction filter cartridge 1 is shown in a side view. The suction filter cartridge 1 has a central housing part 2, which has the down-current chamber 2a, and a housing part 3 laterally mounted to the housing part 2. The off-set arrangement of the housing parts 2 and 3 serves the purpose that the up-current and down-current chambers can be embodied with a large volume at a narrow width of the water vessel.

The suction filter cartridge 1 is supported on a seat element 30, which is located in or at the outlet opening of the water vessel (not shown). The suction pump, not shown either, is connected to the outlet opening. During operation water is suctioned out of the water vessel into the suction filter cartridge 1 and removed through the outlet opening. The seat element 30 may also be an integral component of the water vessel. The seat element 30 has a base plate 31, on which position elements 32 are arranged in an annular manner, which will be described in greater detail in the following.

Figure 2A:
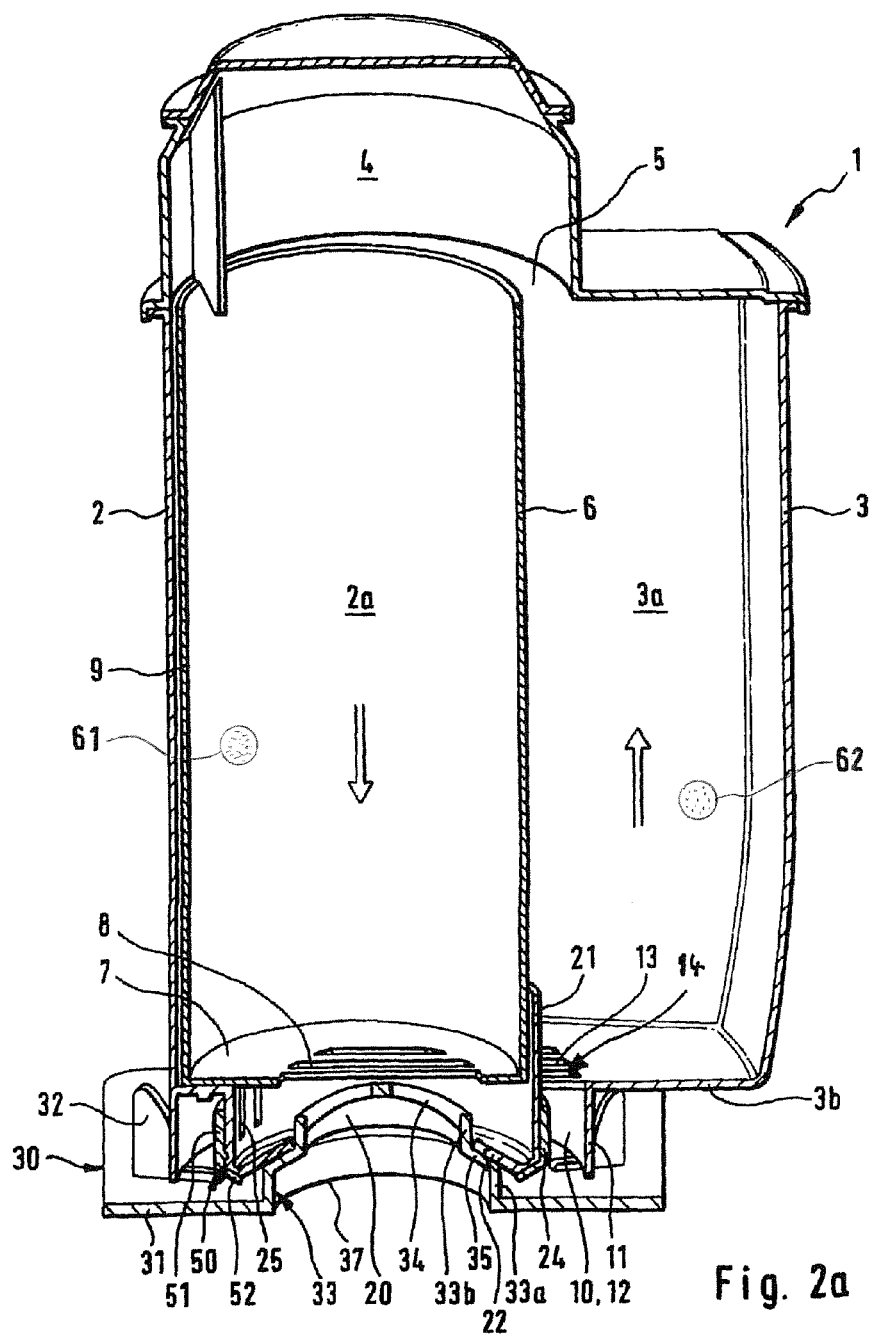
FIG. 2a is a vertical cross-section through FIG. 1 showing a filter cartridge with an attached seat element.

FIGS. 2a, b show a vertical cross-section through the suction filter cartridge 1 with an attached seat element 30. In the central housing part 2 there is a down-current chamber 2a, which may be filled with a packed bed made from a filter material 61. An up-current chamber 3a is located in the attached housing part 3 with the bottom wall 3b, which may comprise a fluidized bed made from a filter material 62. This up-current chamber 3a is separated by a vertically arranged separating wall 6 from the down-current chamber 2a. In the embodiment shown here the separating wall 6 is a component of the circumferential wall of the down-current insert 9, which is additionally provided with a bottom wall 7 with a centrally arranged floor grid 8. Both chambers 2a, 3a are connected to a connection opening 5 via a connection chamber 4 arranged in the upper area of the suction filter cartridge 1.

The inlet area 10 is arranged in the lower section of the suction filter cartridge 1, embodied as a circular channel 12. Said circular channel 12 is formed by a circular wall 11, protruding downwards from the central and attached housing 2, 3, and an outlet sleeve 21 surrounding the outlet opening 20 of the down-current chamber 2a. The circular chamber 12 empties into the up-current chamber 3a via a grid 13 in the bottom wall 3b. The grid 13 is provided with the inlet openings 14.

The outlet sleeve 21 is provided with first openings 25, connecting the inlet area 10 and/or the circular channel 12 with the outlet opening 20. This represents slot-shaped openings 25, arranged distributed over a section of the perimeter of the outlet sleeve 21. At the lower end of the outlet sleeve 21a closed circular snap-on rim 22 is linked via a film link 23, which protrudes radially inward into the outlet opening 20. At the exterior wall of the outlet sleeve 21 a adjustment ring 50 is arranged, having a cylindrical section 51 and a collar 52, inclined at an angle towards the inside. In the cylindrical section 51 second openings 53 are arranged (also see FIG. 4), which can be aligned by rotating the adjustment ring 50 to the first openings 25. The first and second openings 25, 53 together form the bypass openings.

The seat element 30 is provided with a connecting sleeve 33 surrounding its outlet opening 37, comprising a lower section 33a and a section 33b with its diameter being reduced. A circular shoulder 35, pointing upwards in an inclined fashion, is arranged between the two sections 33a, 33b, forming the actuator for the snap-on rim 22. Bars 34 span over the outlet opening 37 at the upper section 33b.

When placing the suction filter cartridge 1 onto the seat element 30 the snap-on rim 22 is grasped by the circular shoulder 35 and turned upward into the second snap position, in which it contacts the section 33b of the connecting sleeve 33 in a sealing and clamping manner, thus fixing the suction filter cartridge 1. The exterior diameter of section 33b is slightly larger than the interior diameter of the snap-on rim 22 in its second snap position, in order for the desired clamping forces to develop. Additional closing elements are unnecessary.

When the water vessel is filled and/or the suction pump is switched off the suction filter cartridge cannot float. Additional fixing or fastening means for the suction filter cartridge 1 are therefore not necessary.

Figure 2B:
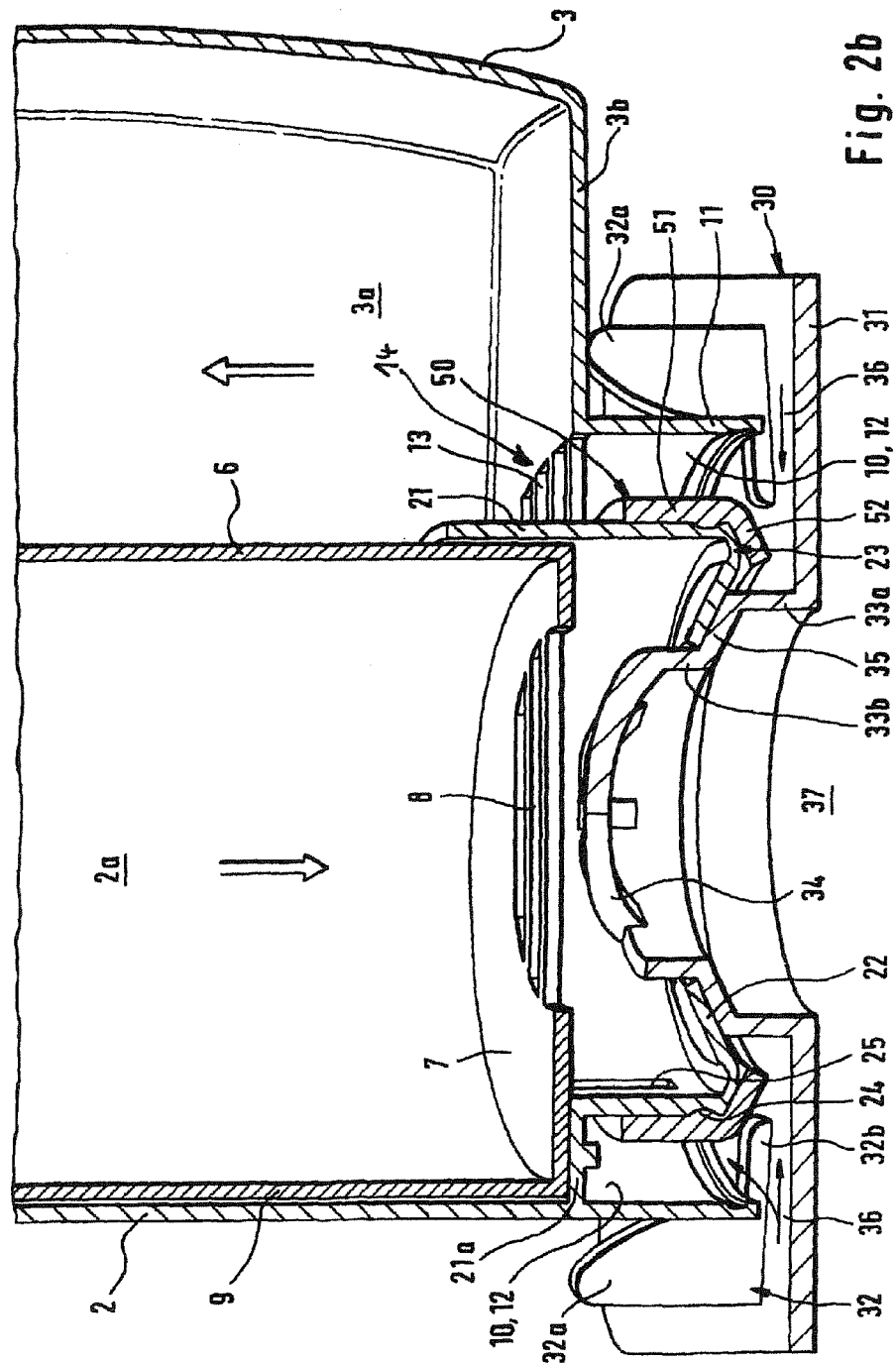
FIG. 2b is an enlarged representation of the outlet area of the suction filter cartridge shown in FIG. 2a, FIG. 3 is a vertical cross-section through the suction filter cartridge shown in FIGS. 1 and 2a, and 2b, without a seat element.

The seat element 30 is provided with positioning elements 32, comprising the towering centering elements 32a and the spacers 32b. The circular wall 11 of the suction filter cartridge 1 is supported on the spacers so that crude water can flow into the suction filter cartridge 1 through the intermediate space between the base plate 31 and the circular wall 11. This way, inlet channels 36 are formed (see FIG. 2b) between the positioning elements 32.

Figure 3:
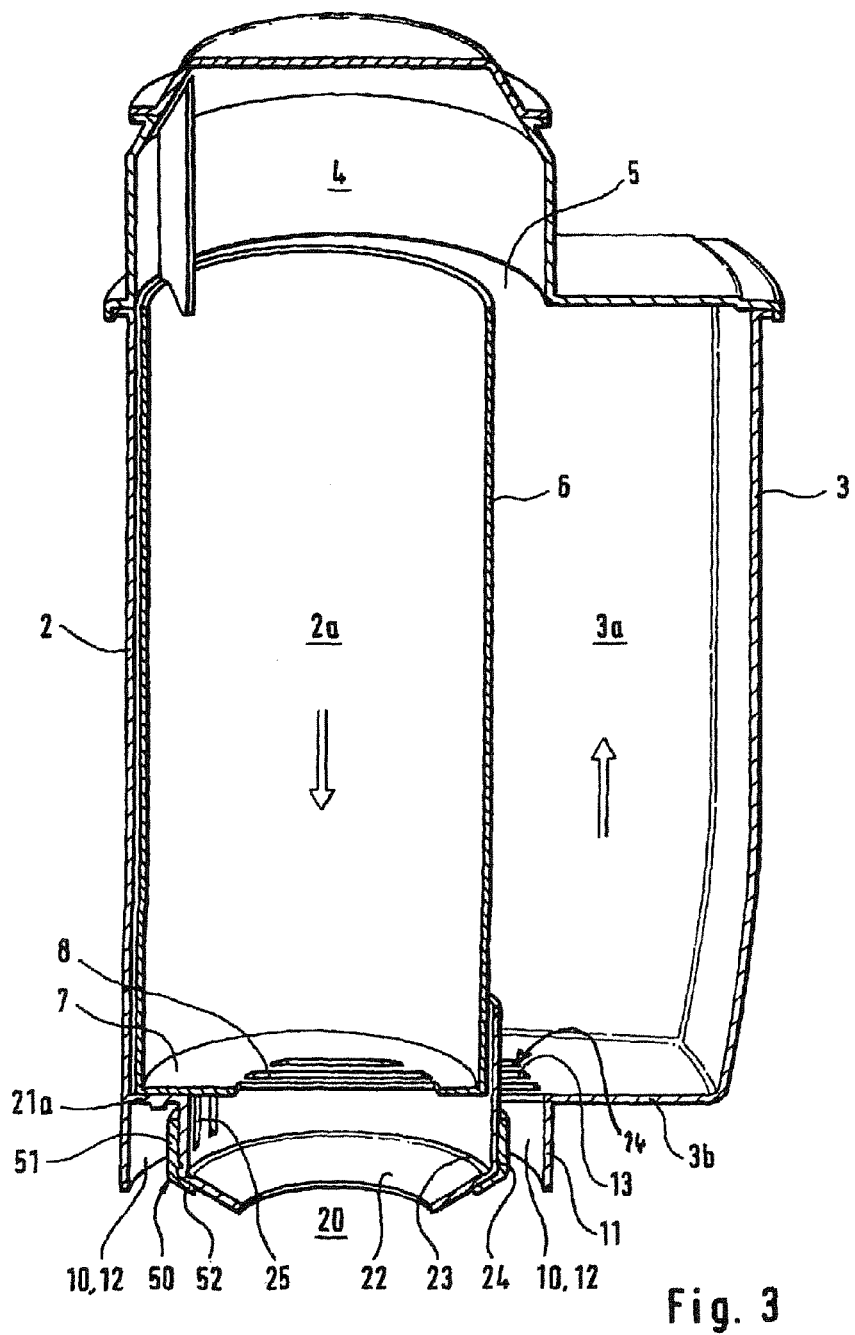

In FIG. 3 the suction filter cartridge 1 is shown with the snap-on rim 22 in its lower snap position, in which the snap-on rim 22 is supported on the collar 52 of the adjustment ring 50. In order to seal [the gap] between the adjustment ring 50 and the outlet sleeve 21 the adjustment ring 50 is provided with an encircling sealing bead 24 at the cylindrical section 51.

Figure 4:
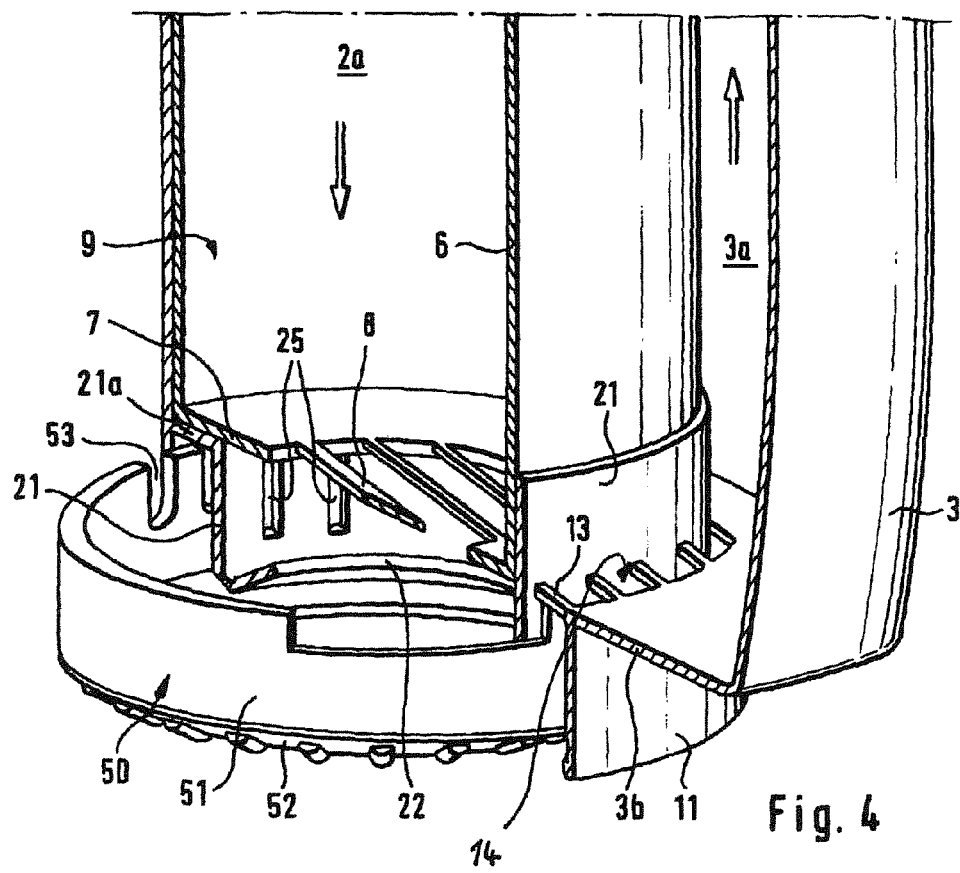
FIG. 4 is an enlarged perspective representation of the lower section of the suction filter cartridge shown in FIGS. 1 through 3, partially in a cross-section.

In FIG. 4 the lower section of the suction filter cartridge 1 is shown enlarged and in a perspective. The rotary adjustment ring 50 is provided with second openings 53, which are located opposite to the first openings 25. By rotating the adjustment ring 50 these second openings 53 can be aligned to the first openings 25. Depending on the level of overlapping of the openings 25, 53 more or less crude water can be guided from the inlet area 10 directly into the outlet opening 20.

Figure 5:
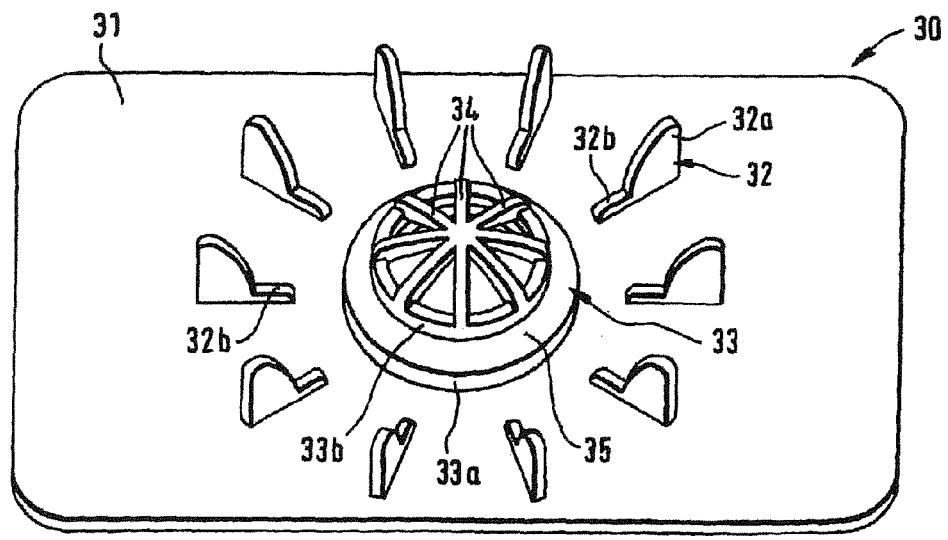
FIG. 5 is a perspective top view of the seat element shown in FIGS. 1 and 2a, 2b.

The seat element 30 is shown in a perspective in FIG. 5. It is discernible that the connecting sleeve 33 is surrounded by an annulus of positioning elements 32.

Figure 6:
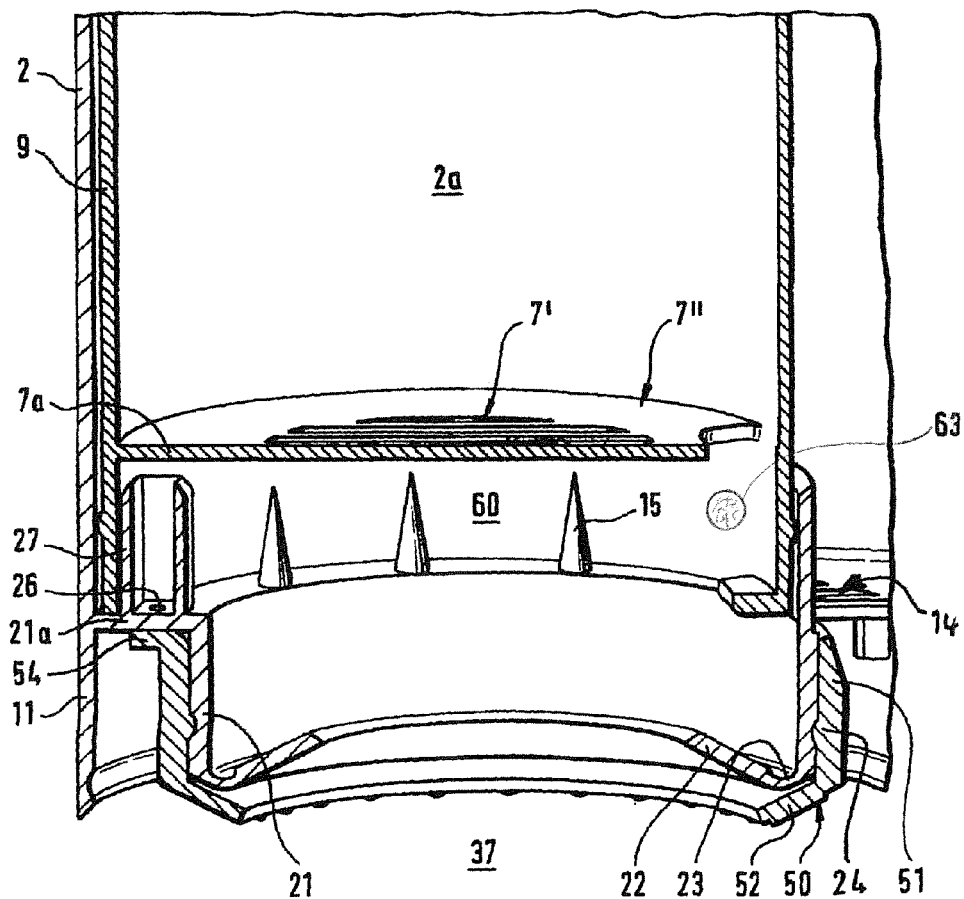
FIG. 6 is an enlarged cress-section of the lower area of the suction filter cartridge according to another embodiment.

FIG. 6 shows the lower section of a suction filter cartridge 1 according to another exemplary embodiment relating to the bypass openings. Differently from the previously described embodiments, here at least one bypass opening 26, preferably embodied as bores in the bottom wall 21a, connect the outlet sleeve 21 with the circular wall 11. This bottom wall 21a is also shown in FIGS. 2a, 2b, 3, and 4, with the bottom wall 7 of the down-current insert 9 resting on said bottom wall 21a. In the embodiment shown in FIG. 6 the bottom wall 7 is omitted so that the bottom wall 21a closes the down-current chamber 2a at the bottom. The crude water flowing into the circular channel 12 through the bypass openings 26, with in FIG. 6 only one bypass opening 26 being shown, is not guided immediately into the outlet opening 37 but into the interior of the down-current chamber 2a, provided at a distance from the bottom wall 21a with an intermediate floor 7a permeable by liquids. The permeability of the intermediate floor 7a is limited to a central area 7'. By said intermediate floor 7a another chamber 60 is separated in the lower section of the down-current chamber 2a. Inside said chamber 60 risers 27 are arranged bypassing the bypass openings 26. The crude water is guided upwards through these risers 27 and deflected by the not permeably circular area 7" of the intermediate floor 7a. In chamber 60 a filter material may be arranged, for example an activated carbon fleece 63, which is held by needles 15.

In order to close and/or release the bypass openings 26, the adjustment ring 50 is provided with a closing element 54 at the upper edge, which is formed to the adjustment ring 50. In order to prevent unintentional bypassing this closing element 54 contacts the bottom of the floor wall 21a in a sealing manner. The closing element 54 comprises an arc-shaped collar, as discernible from FIG. 7. By rotating the adjustment ring 50 the bypass openings 26 may be released or closed.

Figure 7:
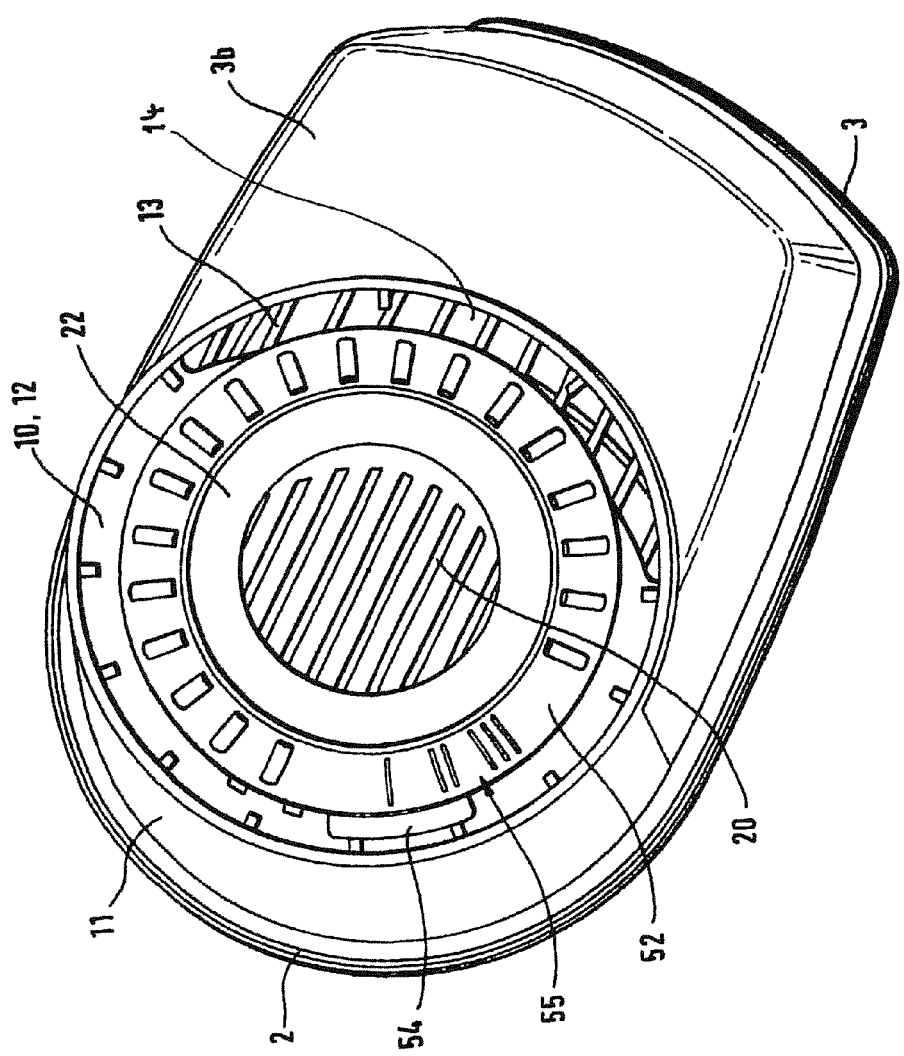
FIG. 7 is a perspective bottom view of the outlet opening of the suction filter cartridge.

In FIG. 7 a perspective bottom view to the outlet opening 20 of the suction filter cartridge 1 is shown. The collar 52 is provided with markings 55 showing the operator the present position of the adjustment ring 50. The adjustment ring 50 may be rotated by the operator via corrugation, so that he/she can adjust the desired amount of liquids that shall be deflected into the outlet opening 20. Additionally the closing element 54 is shown as an arc-shaped collar of the adjustment ring 50.

LIST OF REFERENCES

1 Suction filter cartridge
2 Central housing part
2a Down-current chamber
3 Attached housing part
3a Up-current chamber
3b Bottom wall
4 Connecting chamber
5 Connecting openings
6 Separating wall
7 Bottom wall
7' Permeable section
7" Impermeable section
7a Intermediate floor
8 Bottom grid
9 Down-current insert
10 Inlet area
11 Circular wall
12 Circular channel
13 Grid
14 Inlet opening
15 Needles
20 Outlet opening
21a Bottom wall
21 Outlet sleeve
22 snap-on rim
23 Film link
24 Sealing bead
25 First opening
26 Bypass opening
27 Riser
30 Seat element
31 Base plate
32 Positioning element
32a Centering element
32b Spacers
33 Connecting sleeve
33a Lower section
33b Upper section
34 Bar
35 Circular shoulder
36 Inlet channel
37 Outlet opening
50 Adjustment ring
51 Cylindrical section
52 Collar
53 Second openings
54 Closing element
55 Marking
60 Chamber It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A suction filter cartridge (1) comprising: at least one up-current chamber (3a), wherein at least one filtering medium is present in the at least one up-current chamber, and with at least one down-current chamber (2a), another chamber (60) having a bottom wall (21a) positioned below the down-current chamber (2a), wherein at least one filtering medium is present in the at least one down-current chamber, which chambers (3a, 2a) communicate with one another in an upper connecting chamber of the cartridge, and with an inlet area (10) arranged upstream of at least one inlet opening (14) and with an outlet opening (20) which are both arranged in a bottom area of the cartridge, wherein an outlet sleeve (21) is present on the outlet opening (20), wherein the inlet area (10) surrounds the outlet sleeve (21) in an annular manner, wherein at least one rotatable adjustment ring (50) is present on the outlet sleeve (21), wherein at least one bypass opening (26) is provided in the bottom wall (21a) of said another chamber (60), wherein a closing element (54) is present on the adjusting ring (50) and rests against an underside of the bottom wall (21a) and is position-able over the bypass opening (26) to permit adjustment of a cross-sectional size of the bypass opening (26) such that an added amount of untreated crude water can be added to water treated by the at least one filter mediums in a controlled manner.

2. The filter cartridge according to claim 1, wherein a riser (27) surrounding the bypass opening (26) is arranged in said another chamber (60).

3. The filter cartridge according to claim 1, wherein the closing element (54) is an arc-shaped collar.

4. The filter cartridge according to claim 1, wherein the down-current chamber (2a) has a liquid-permeable intermediate bottom floor (7a).

5. A suction filter cartridge (1) comprising: at least one up-current chamber (3a), wherein at least one filtering medium is present in the at least one up-current chamber, and with at least one down-current chamber (2a) wherein at least one filtering medium is present in the at least one down-current chamber, which chambers (3a, 2a) communicate with one another in an upper connecting chamber of the cartridge, and with an inlet area (10) arranged upstream of at least one inlet opening (14) and with an outlet opening (20) which are both arranged in a bottom area of the cartridge, wherein an outlet sleeve (21) is present on the outlet opening (20) and wherein the inlet area (10) surrounds the outlet sleeve (21) in an annular manner, wherein at least one rotatable adjustment ring (50) is present on the outlet sleeve (21), wherein at least one first opening (25) is present on the outlet sleeve, wherein a cylindrical portion (51) is present on the adjustment ring (50) which rests against the outlet sleeve (21) and in which at least one second opening (53) is provided, which can be brought into coincidence with the first opening (25), whereby rotation of the adjustment ring adjusts a cross-sectional size of the bypass such that an added amount of untreated crude water can be added to water treated by the at least one filter mediums in a controlled manner.

6. The filter cartridge (1) according to claim 5, wherein a size of the second opening (53) in the adjustment ring (50) is > a size of the first opening (25) in the outlet sleeve (21).

7. The filter cartridge (1) according to claim 5, wherein the cylindrical portion (51) rests against the outside of the outlet sleeve (21) in a sealed manner.

8. The filter cartridge (1) according to claim 5, wherein the adjustment ring (50) rests on the outlet sleeve (21) in a sealed manner.

9. The filter cartridge (1) according to claim 5, wherein at least one sealing bead (24) is present on and extends around a circumference of the adjustment ring (50).

10. A suction filter cartridge (1), comprising: at least one up-current chamber 3(a), wherein at least one filtering medium is present in the at least one up-current chamber (3a), and with at least one down-current chamber (2a) wherein at least one filtering medium is present in the at least one down-current chamber, which chambers (3a, 2a) communicate with one another in an upper connecting chamber of the cartridge, and with an inlet area (10) arranged upstream of at least one inlet opening (14) and with an outlet opening (20) which are both arranged in a bottom area of the cartridge, wherein the outlet opening (20) is connected to the inlet area (10) via a bypass arranged below the down-current chamber (2a), wherein an outlet sleeve (21) is present on the outlet opening (20) and wherein the inlet area (10) surrounds the outlet sleeve (21) in an annular manner, wherein an inwardly extending, circumferential snap-on-rim (22) is provided in the outlet opening (20) and is tiltable from a first, lower snap position into a second, upper snap position and vice versa.

11. The filter cartridge (1) according to claim 10, wherein the snap-on rim (22) is articulated on the lower edge of the outlet sleeve (21).

12. The filter cartridge (1) according to claim 10, wherein the snap-on rim (22) is articulated via a film link (23).

13. The filter cartridge (1) according to claim 12, wherein the up-current chamber (3a) has a fluidized bed (4) and the down-current chamber (2a) has a fixed bed (5).

14. The filter cartridge (1) according to claim 10, wherein the snap-on rim (22) is a flat edge strip extending radially inwards.

15. The filter cartridge (1) according to claim 10, wherein at least one rotatable adjustment ring (50) is present on the outlet sleeve (21), wherein the adjusting ring (50) has an angled collar (52) which projects into the outlet opening (20) and against which the snap-on rim (22) rests in its first, lower snap position.

16. A suction filter cartridge (1), comprising: at least one up-current chamber (3a), wherein at least one filtering medium is present in the at least one up-current chamber (3a), and with at least one down-current chamber (2a) wherein at least one filtering medium is present in the at least one down-current chamber, which chambers (3a, 2a) communicate with one another in an upper connecting chamber of the cartridge, and with an inlet area (10) arranged upstream of at least one inlet opening (14) and with an outlet opening (20) which are both arranged in a bottom area of the cartridge, wherein the outlet opening (20) is connected to the inlet area (10) via a bypass arranged below the down-current chamber (2a), wherein the down-current chamber (2a) has a liquid-permeable intermediate floor (7a), wherein a filtering medium is arranged in a another chamber (60) formed between a bottom wall (21a) of said another chamber and the intermediate bottom floor (7a).

17. The filter cartridge according to claim 16, wherein the filtering medium in said another chamber (60) is an active carbon fleece.

* * * * *